W. J. BRADLEY.
PROCESS FOR ROLLING RAIL JOINT BARS.
APPLICATION FILED NOV. 8, 1913.
1,094,053. Patented Apr. 21, 1914.
5 SHEETS—SHEET 1.
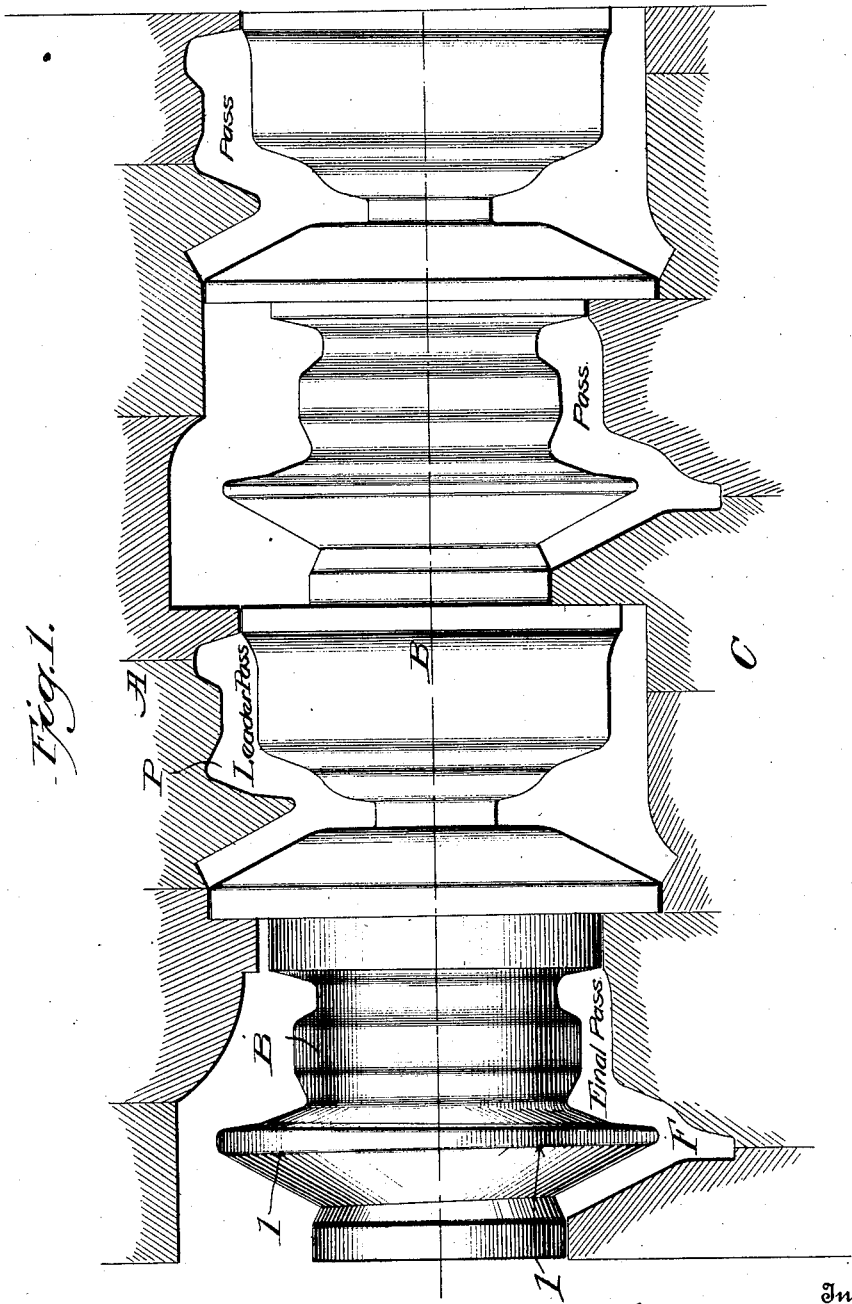

W. J. BRADLEY.
PROCESS FOR ROLLING RAIL JOINT BARS.
APPLICATION FILED NOV. 8, 1913.
1,094,053.
Patented Apr. 21, 1914.
5 SHEETS—SHEET 2.
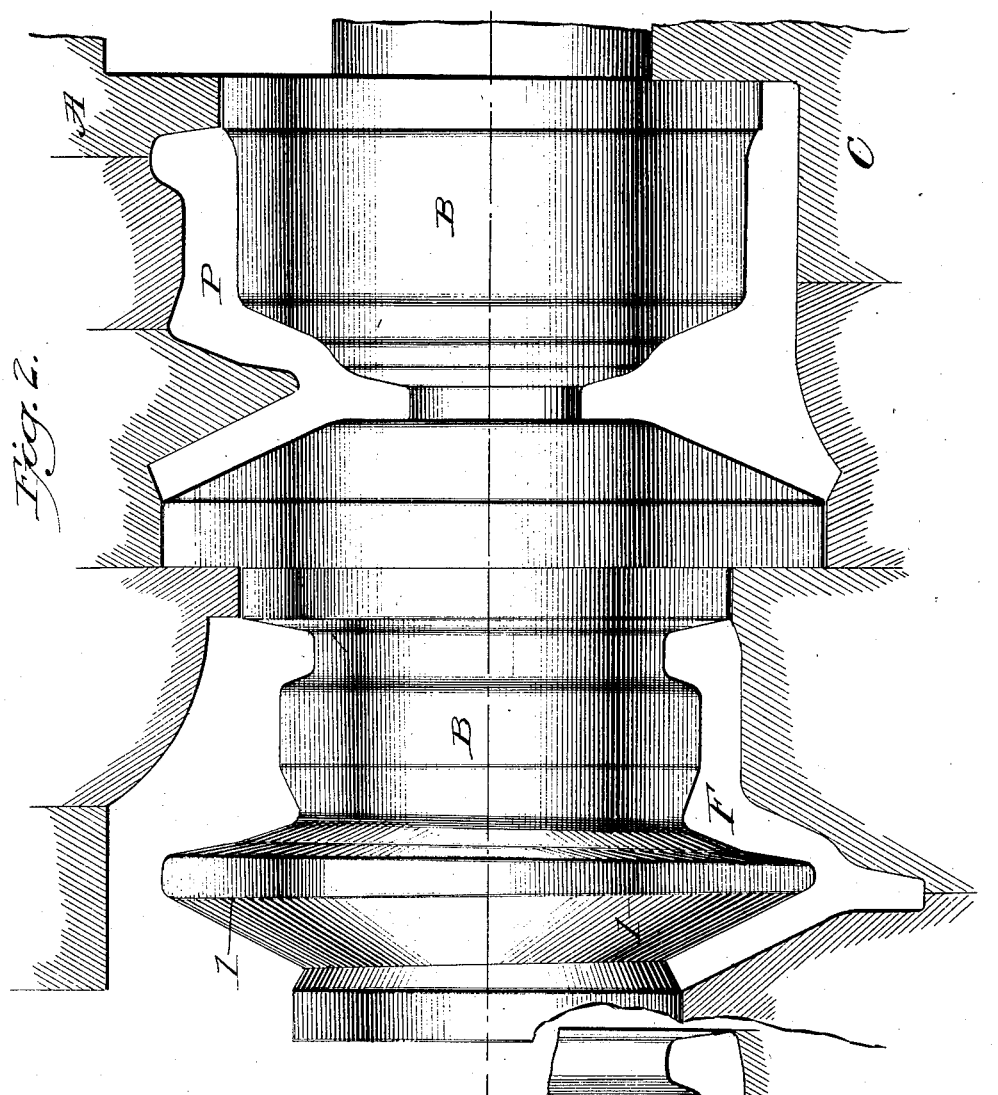
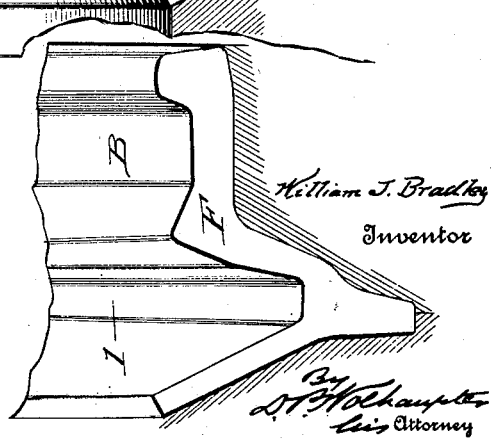

W. J. BRADLEY.
PROCESS FOR ROLLING RAIL JOINT BARS.
APPLICATION FILED NOV. 8, 1913.
1,094,053.
Patented Apr. 21, 1914.
5 SHEETS—SHEET 3.
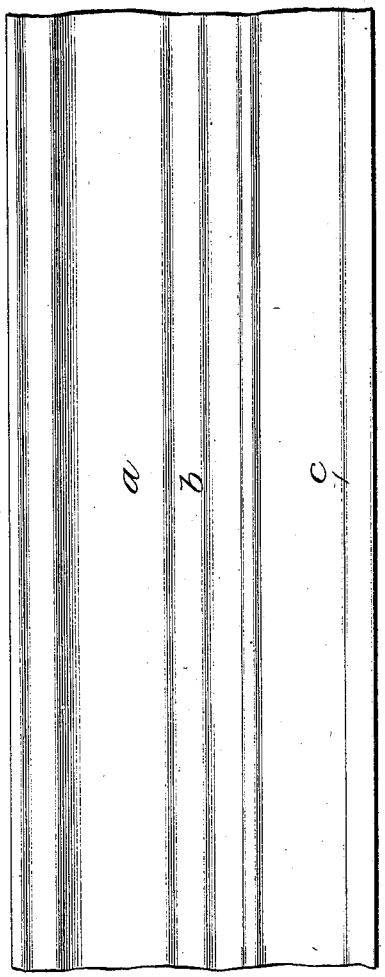
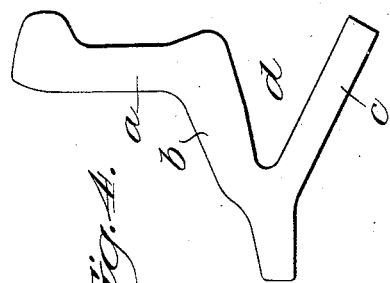
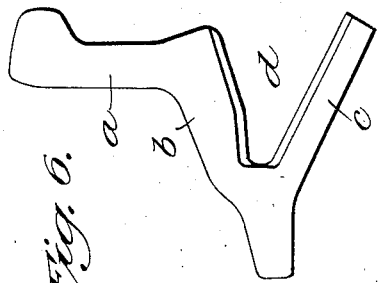
Inventor
William J. Bradley
Witnesses
By
Attorney

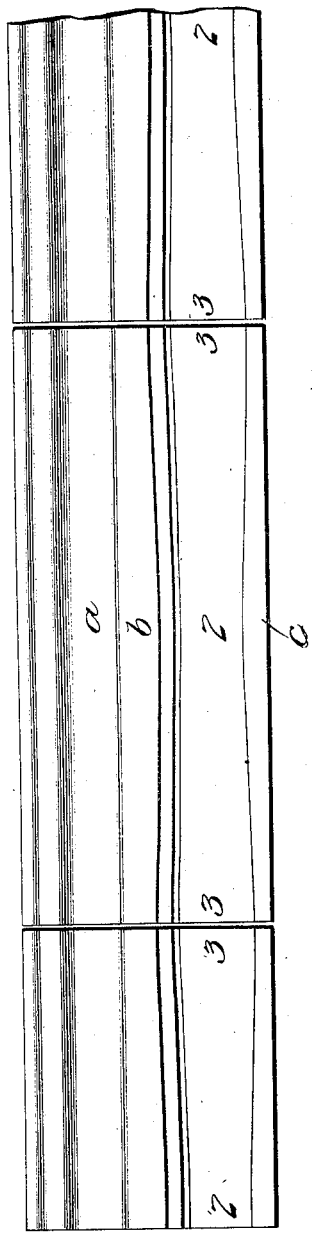
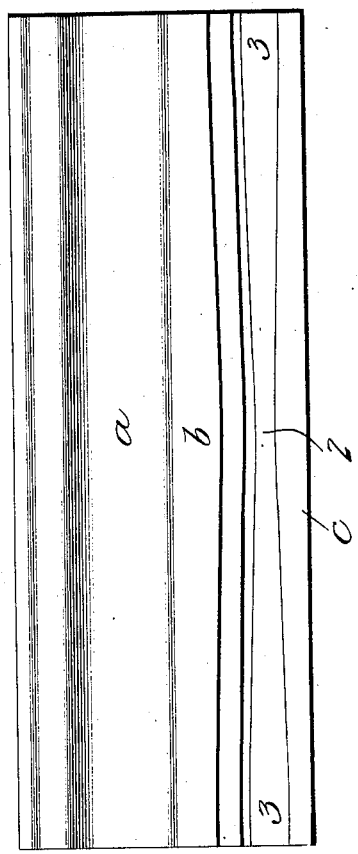
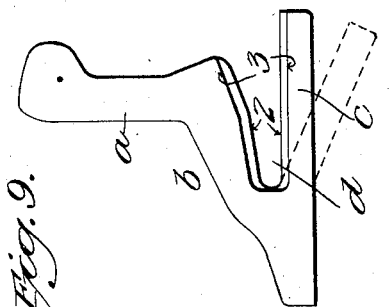

W. J. BRADLEY.
PROCESS FOR ROLLING RAIL JOINT BARS.
APPLICATION FILED NOV. 8, 1913.
1,094,053.
Patented Apr. 21, 1914.
5 SHEETS—SHEET 5.
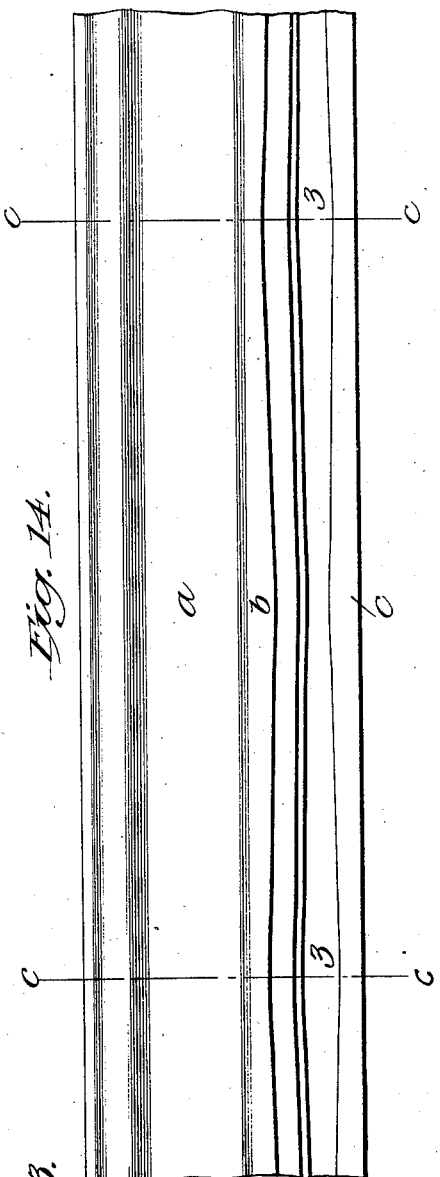
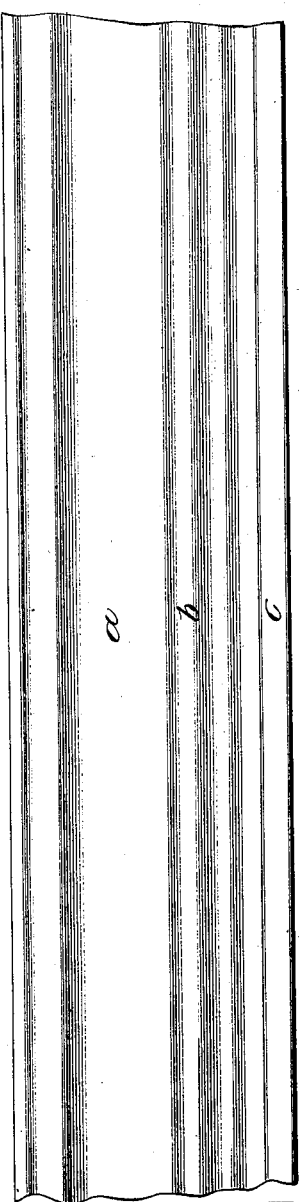
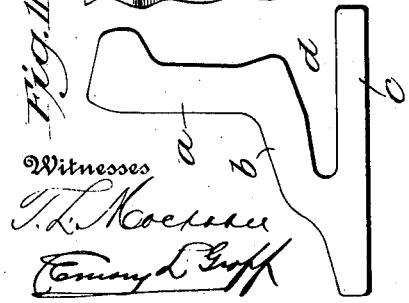

ically finished form, the inclined flange $b$ of the metal
UNITED STATES PATENT OFFICE.

WILLIAM J. BRADLEY, OF TROY, NEW YORK, ASSIGNOR TO THE RAIL JOINT COMPANY, OF NEW YORK, N. Y., A CORPORATION OF NEW YORK.

PROCESS FOR ROLLING RAIL-JOINT BARS.

1,094,053.  Specification of Letters Patent.  Patented Apr. 21, 1914.

Application filed November 8, 1913. Serial No. 799,951.

*To all whom it may concern:*

Be it known that I, WILLIAM J. BRADLEY, a citizen of the United States, residing at Troy, in the county of Rensselaer and State of New York, have invented certain new and useful Improvements in Processes for Rolling Rail-Joint Bars, of which the following is a specification.

This invention relates to the manufacture of rail joint bars of the type clamping the rails firmly at the center of the joint only, leaving the balance of the joint with no clamping action.

In the production of rail joint bars of the character referred to, it is proposed by the present invention to provide a simple and economical process that may be carried out mainly in the passes of a rolling mill, which process is continuous in its operation and provides means whereby a joint bar may be formed in such way as to effect its rail splicing and rail supporting functions by securing a novel shaping and disposing of certain portions of the metal shape, but at the same time not weakening the bar at any point. The final form of the bar having the structural characteristics referred to is secured by severing the bar at predetermined points.

The process of the invention may be carried out in different ways without departing from the spirit or principle thereof, but to illustrate one practical means of employing the process, reference is made to the accompanying drawings, in which—

Figure 1 is an elevation partly in section of the set of finishing rolls of a rolling mill having leader and final passes specially designed to carry out the present process, the roll parts being drawn to a special scale for illustrative purposes to emphasize the shape, size and relation of said passes. Fig. 2 is an enlarged view of the portions of the rolls forming the leader and final passes, showing the narrowest part of the circular wedge within the pass, said view likewise being drawn to a special scale to emphasize the shape, size, and relation of the passes. Fig. 3 is an enlarged view of the final pass showing the widest part of the circular wedge within the pass. Fig. 4 is an end view of the metal shape or bar as delivered from the leader pass and as received by the final pass with the small part of the wedge projecting therein. Fig. 5 is an inner side elevation of the metal shape or bar shown in Fig. 4. Fig. 6 is an end view of the metal shape or bar as delivered from the final pass and illustrating the same as affected by the larger part of the circular wedge when the latter projects into the pass as shown in Fig. 3. Fig. 7 is an inner side elevation of the bar section shown in Fig. 6. Fig. 8 is a view similar to Fig. 7 showing the bar severed into rail joint lengths. Fig. 9 is an end view of one of the rail joint lengths of Fig. 8 showing by full and dotted lines the base member moved from open to closed position. Fig. 10 is an elevation of the bar projected from Fig. 9. Figs. 11 and 12 are an end and projected elevation respectively illustrating a modification of the invention wherein the metal shape or bar as delivered from the leader pass has the base member thereof closed to its final plane. Figs. 13 and 14 are views similar to Figs. 11 and 12 showing the bar with the closed base member as delivered from the final pass and as affected by the circular wedge.

Like reference characters designate corresponding parts in the several figures of the drawings.

The present process includes the preliminary development of a bar blank in the passes of a rolling mill until the bar reaches a form wherein it includes the splice member $a$, an inclined flange $b$, and a base member $c$. This metal shape, according to the present invention, is given its approximately final form and size in the second last or "leader" pass P of a set of mill rolls A, B, and C. The walls of the "leader" pass P have the structural characteristics of the metal shape shown in Fig. 4 of the drawings whereby the splice member $a$ is given an enlarged substantially finished form, the inclined flange $b$ of the metal shape is given substantially its final inclination and form but is also left with a surplus of metal therein, and the base member $c$ of the bar is likewise left with a surplusage of metal in order to admit of the further reductions provided for by the next succeeding or final pass of the said rolls, which is designated by the reference character F.

The final shaping pass F presents different structural characteristics from all preceding passes. The tonguing roll B, forming a wall of this final pass F, is provided with an annular projecting tongue 1 which has a uniform projection from the body of the roll, but is circumferentially graduated in width, that is to say, it gradually tapers in width or thickness from a point of maximum width or thickness to a point of minimum width or thickness, thus presenting not only the structural, but also the functional, characteristics of a double circular wedge that rolls within the reëntrant groove $d$ formed between the flange $b$ and base member $c$ of the metal shape. Accordingly, it will be perceived that the metal shape as delivered from the pass P has formed therein from one side, a reëntrant groove $d$, which is of uniform shape and size throughout, with both walls thereof in the same plane throughout. When this shape is introduced into the final pass F, the tongue 1 of the roll B travels within the said uniform groove $d$, and, by reason of its rolling wedge characteristic, entirely alters the character of the groove $d$. That is to say, gradually spreads or widens the latter at regular intervals so that there is formed throughout the length of the groove $d$, alternating constricted channels 2 and bowed widened spaces 3, which latter taper in both directions from their centers to meet the constricted channels aforesaid. This novel and peculiar formation throughout the groove $d$ of the rolled bar is shown in Fig. 7 of the drawings, as well as the distribution of the metal which is effected by the different portions of the final pass. In this connection, it should be noted that in the last pass the double-wedge tongue 1 not only spreads the groove between the flange and base members of the bar at intervals, but also extends and displaces the metal of said members, the metal being so distributed in this reduction as to leave the bottom of the base member as it was when leaving the leader pass. Also, it should be noted that simultaneously with the shaping and reducing action of the double-wedge feature of the roll of the final pass, the final pass also proportionately reduces the splice member to its final size.

The metal shape of Figs. 6 and 7 of the drawings is in its finished form, so that the next step of the process consists in shearing or cutting the bar into lengths at points indicated by the dotted lines $c$—$c$ on Fig. 7 of the drawings, said dotted lines intersecting the centers of the spaces 3, at their maximum width, so that the bar length between any pair of the lines $c$—$c$ will present a tapering effect having certain practical functions in rail joint structures.

The cut bar lengths are shown in Fig. 8 of the drawings, and it will be understood that the final step in the preparation of each length for use as a rail joint bar consists in moving the base member of the bar to its closed or final plane as shown in Fig. 9 of the drawings. This operation is one that is well known in the art and may be performed for instance by a bull-dozing machine or press.

As far as the essential features of the process are concerned, the same may be carried out regardless of whether the base member $c$ of the metal shape is in the open or angularly disposed position shown in Figs. 4, 5, 6, and 7 inclusive, or in the closed position illustrated in Figs. 11 to 14 inclusive of the drawings. With a bar of either of these shapes, the rolling wedge effect of the tongue 1, within the groove $d$ will be the same as already described.

As already indicated, it is to be understood that other means and instrumentalities might be employed to carry out the hereindescribed process without departing from the spirit or principle of the invention, the hereindescribed instrumentalities being simply used as an illustration of one method by which the process may be performed.

I claim:

1. The process of manufacturing rail joint bars which consists in first rolling a bar to approximately its final rail clamping shape, then subjecting the bar to another roll pass to alter the bar whereby rail-clamping portions are left in alternate areas, and subsequently severing the bar at approximately equal distances from said rail clamping portions.

2. A process of making bars for rail joints which consists in subjecting a metal blank to a roll pass producing a bar having a flange member and a base member separated to form a uniform groove therebetween, then subjecting the bar to another roll pass to widen the said groove in alternate areas, and subsequently severing the bar at the maximum width of said alternate areas.

3. A process of making bars for rail joints which consists in subjecting a metal blank to a roll pass to produce a bar having a splice member in its final shape and a flange and base member separated to leave a uniform groove therebetween, then subjecting the bar to another roll pass to widen the said groove in alternate areas, and subsequently severing the bar at the maximum width of said alternate areas.

4. A process for making bars for rail joints which consists in subjecting a metal blank to a roll pass to produce a bar having a splice member of final shape and a flange member and base member of unfinished size and spaced apart to leave a uniform groove therebetween, then subjecting the bar to another roll pass to widen the said groove in alternate areas, and subsequently severing the bar at the maximum width of said alternate areas.

5. The process of making rail joint bars which consists in subjecting a metal blank to a roll pass producing a bar having a splice member, a flange member and a base member, with the flange member and base member separated to form a uniform groove therebetween, then subjecting the bar to another roll pass to reduce the splice member and to widen the said groove in alternate areas, and subsequently severing the bar at approximately the maximum width of said alternate areas.

6. The process of making rail joint bars which consists in first rolling a bar to a shape approximating its finished rail clamping shape, but having a greater angle between its rail seating base portion and its flange portion than in the finished bar, then subjecting the bar to another roll pass to alter the bar whereby rail clamping portions are left in alternate areas, then severing the bar at approximately equal distances from said rail clamping portions, and finally moving each rail seating portion to partially close it and shape the bar to a fit at the rail clamping portions.

7. The process of making rail joint bars which consists in subjecting a metal blank to a roll pass producing a bar having a flange member and a rail seating base portion separated at a greater angle than in the finished bar, then subjecting the bar to another roll pass to alter the bar whereby rail clamping portions are left in alternate areas, then severing the bar at approximately equal distances from said rail clamping portions, and finally moving each rail seating portion to shape the bar to a fit at the rail clamping portions.

In testimony whereof I hereunto affix my signature in the presence of two witnesses.

WILLIAM J. BRADLEY.

Witnesses:
   E. F. SCHERMERHORN,
   C. HOWARD NASH.